United States Patent [19]
Magni

[11] Patent Number: 5,337,853
[45] Date of Patent: Aug. 16, 1994

[54] DIFFERENTIAL-BRAKE GROUP FOR VEHICLE DRIVING AXLES

[75] Inventor: Giorgio Magni, Modena, Italy

[73] Assignee: OMCI S.p.A. Officine Metalmeccaniche Construzioni Industriali, Modena, Italy

[21] Appl. No.: 997,097

[22] Filed: Dec. 29, 1992

[30] Foreign Application Priority Data

Jan. 14, 1992 [IT] Italy .................. MO92 A 00004

[51] Int. Cl.$^5$ .................................................. F16D 55/36
[52] U.S. Cl. ....................................... 180/370; 188/71.5
[58] Field of Search .............. 188/71.5; 180/380, 370, 180/245, 375; 475/223, 224

[56] References Cited

U.S. PATENT DOCUMENTS

| | | | |
|---|---|---|---|
| 1,374,947 | 4/1921 | Newhouse | 475/224 |
| 2,547,268 | 4/1951 | Jacobi | 475/224 |
| 2,630,869 | 3/1953 | Armington | 475/224 X |
| 3,095,762 | 7/1963 | Baker | 475/224 X |
| 3,323,389 | 6/1967 | Hause | 475/224 X |
| 4,037,694 | 7/1977 | Keese | 180/370 X |
| 4,787,468 | 11/1988 | Kobayashi | 180/375 |
| 5,119,900 | 6/1992 | Watanabe et al. | 180/245 |

FOREIGN PATENT DOCUMENTS

| | | | |
|---|---|---|---|
| 4003331 | 8/1991 | Fed. Rep. of Germany | 475/223 |
| 2442998 | 6/1980 | France | 475/224 |

Primary Examiner—Robert J. Oberleitner
Assistant Examiner—Peter M. Poon
Attorney, Agent, or Firm—Hoffmann & Baron

[57] ABSTRACT

The invention relates to a differential-brake group for vehicle driving axles. On two supports (31) of a frame (3) the box (5) of a transmission (4) is rotatably mounted, with rotation freedom, the transmission (4) being predisposed for the transmission of drive to two half-shafts (2). Two braking devices (6) are associated to the walls (31), one for each half-shaft (2), which braking devices (6) form a single block with a sort of cover (32) peripherally equipped with a flange (33). In a seating made in the cover (32) the end part (8) of the drive input shaft into the differential is supported by use of bearings. The whole group is conformed in order to be insertable through an aperture (7) in an axle (1) and in order to be fixable to the axle (1) by use of a flange (3)

7 Claims, 2 Drawing Sheets

DIFFERENTIAL-BRAKE GROUP FOR VEHICLE DRIVING AXLES

BACKGROUND OF THE INVENTION

The invention relates to a differential-brake group for vehicle driving axles.

Specifically, but not exclusively, the invention finds application in large vehicle axles. For such types of vehicles, the braking of the drive wheels is preferably made on the half-shafts that receive the drive from a differential and transmit it with or without a final velocity reduction, to the wheel hubs.

Commonly used are oil-immersed disk brakes which can conveniently use the mass of lubricant present in the axle for the dissipation of the considerable quantity of thermal energy created during the braking action.

The prior art embraces the use of disk brakes inserted as an integral part in the structure of the axle. In such cases, the axle is formed in more than one segment, usually three: two lateral segments which contain the half-shafts and one central segment which contains the differential group. The brakes are contained in autonomous segments which are mounted and solidly assembled between lateral segments and the central segment to form a single structure. In such conditions, obviously, the dismounting and the subsequent remounting of the brakes on the relative half-shafts necessarily brings about the mounting and the remounting of the axle in its segments. Remembering that the attachment points of the axle of the vehicle are situated at the lateral segments, the simple need to dismount the brakes for maintenance operations leads to the complete dismounting of the axle from the vehicle.

The prior art also embraces axles formed in a single piece exhibiting two lateral apertures, one for each side of the axle, predisposed in such a way that an entire brake assembly can be introduced and thus also extracted, which brake assembly comprises a frame internally to which a device for the execution of the braking is predisposed. The assembly is fixed to the axle by means of an external flange.

Such solutions, while solving the fundamental problem of permitting the realization of the axle in a single piece, and thus enormously facilitating all the mounting and dismounting operations of the brakes, require that the two openings at the sides of the central part of the axle must be specially designed and have a certain mass which, even if perfectly tolerable for large-sized vehicles, may be difficult to design for smaller vehicles.

Further, the making of the two apertures by the side of the central aperture, which serves to connect the differential to the drive transmission shaft, requires the performing of sufficiently accurate working for each aperture.

SUMMARY OF THE INVENTION

The present invention, as characterized in the claims that follow, proposes to obviate the above-mentioned prior-art inconvenience and drawbacks by providing a special application and configuration of some parts that become constituent parts of the driving axle, in particular of the differential and the brakes acting on the half-shafts, and which are engineered in such a way as not to require further apertures on the axle apart from the central aperture.

Among the advantages offered by the invention, in addition to the constructional simplicity and the rapidity of the mounting and dismounting, it should be remembered that the invention also has the ability to render the functioning of the braking device insensitive to deformations, to which the axle in normal use, that is, under weight, is subject.

BRIEF DESCRIPTION OF THE DRAWINGS

Further advantages and characteristics of the present invention will better emerge from the detailed description that follows, made with reference to the accompanying drawings, which represent a preferred embodiment here illustrated in the form of a non-limiting example, and in which.

DESCRIPTION OF THE PREFERRED EMBODIMENTS

Figure 1:
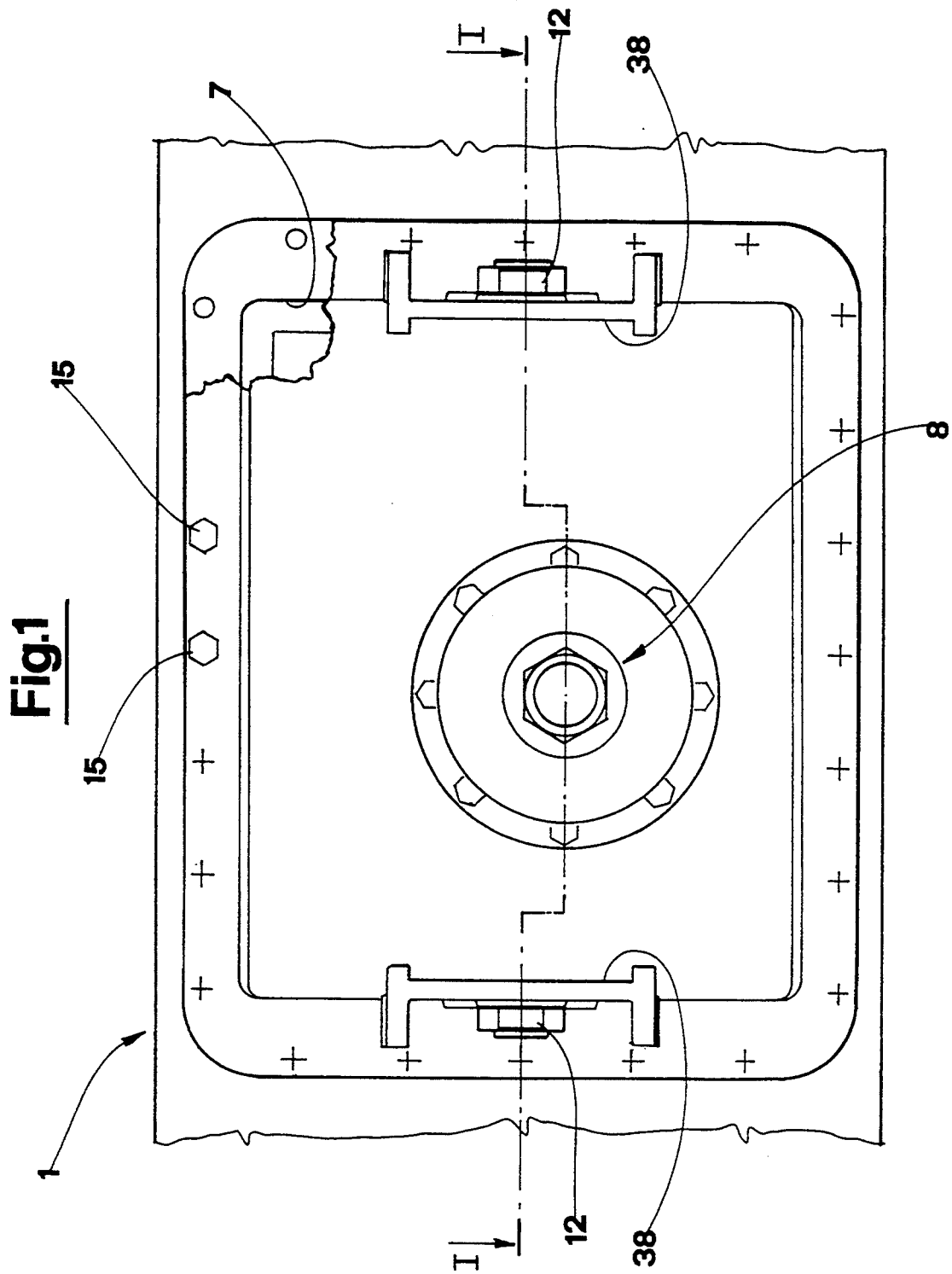
FIG. 1 shows a frontal view of a vehicle axle having a central opening to access a plurality of braking devices.
Figure 2:
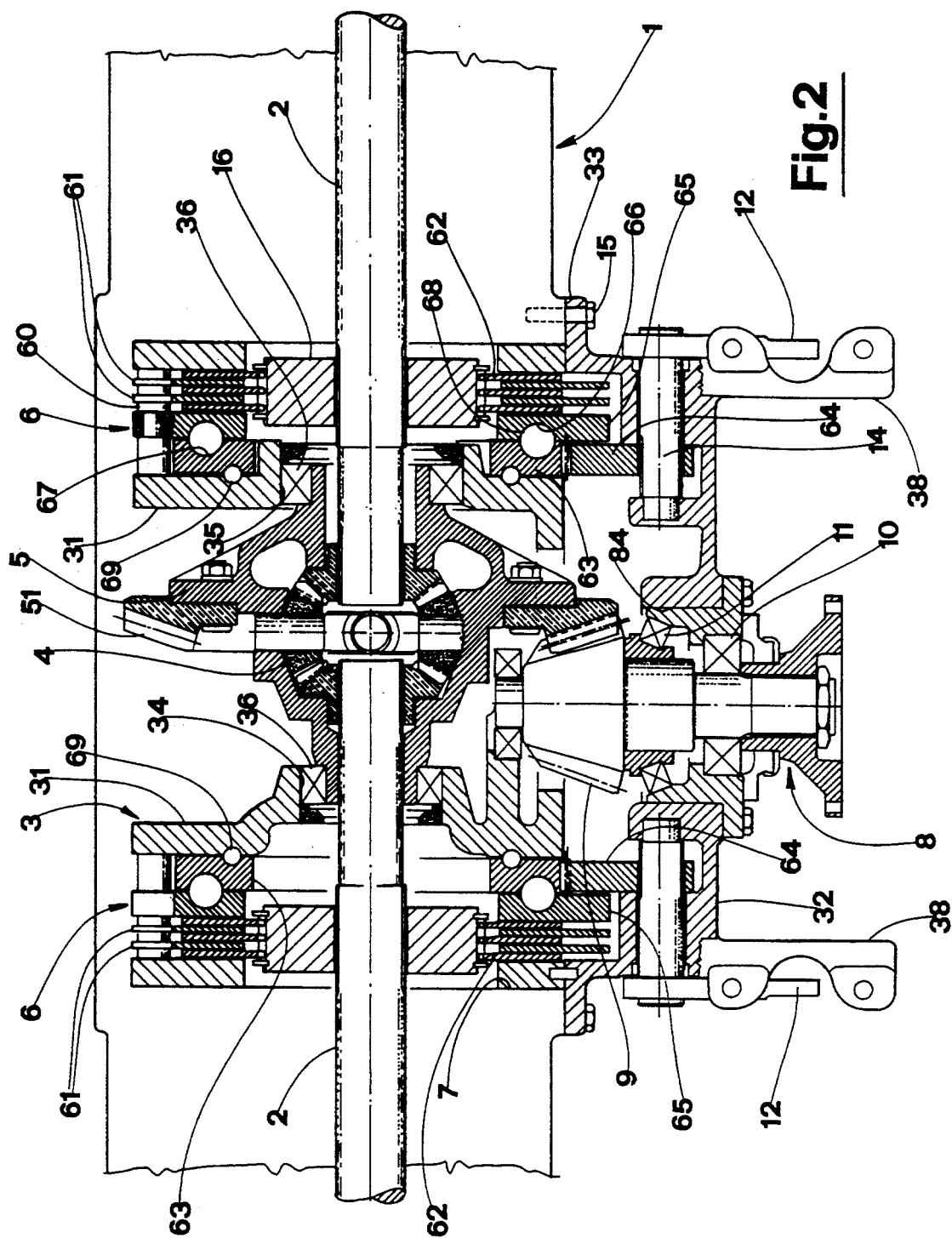
FIG. 2 shows a schematic section made according to line I—I of FIG. 1.

With reference to the drawings, 1 denotes the body of a driving axle equipping a vehicle. The axle 1 is made in a single piece and exhibits a substantially symmetrical structure with respect to a median plane perpendicular to the axle itself. Internally to the axle, two half-shafts 2 are housed, the said half-shafts 2 being predisposed to transmit drive to the wheels. The half-shafts 2 are connected to and receive the drive from a differential mechanism 4 which is contained and supported internally to a frame 3. The said frame 3 is equipped with two walls or elements having a support function 31, opposite between themselves. The differential 4 box 5 is rotatably mounted with liberty of relative rotation between the walls 31 of the frame 3. In particular, on the two walls 31 seatings 34 and 35 are arranged for the housing of a pair of conical-roller bearings 36 on which the differential box 5 is supported. A crown wheel 51 is fixed to the said box 5 which crown wheel 51 receives the drive from a cogged pinion 9 which is solidly constrained to the end part 8 of the drive shaft coupled to the differential 4. The end part 8 of the drive shaft is in turn sealedly coupled by means of bearings 10 and 11 to a seating 84 made in the body of a sort of cover, denoted by 32, bolted to the frame 3. Made on the cover 32 are two double supports 38, predisposed to allow the mounting of actuator cylinders for the control of the braking device and in particular for the performing of the normal braking and the emergency and hand-braking braking. Two braking devices 6 are supported by the support walls 31 at the externally-turned sides thereof, which braking devices 6 are predisposed to couple with the respective half-shafts 2. The two braking devices 6 are solidly connected to form, together with the frame 3, a single compact block predisposed and conformed to be mountable and dismountable on the axle 1 by simple introduction (or extraction) according to a transversal direction to the axle of the half-shafts 2 by themselves through a single collection chamber 7 made on the axle 1 itself. Each braking device 6 is of the oil-immersed disk type and comprises a plurality of coaxial disks composed of two series of disks 61 and 62 side-by-side and alternatingly arranged one series with the other. In particular, the disks 61 and 62 are coupled axially slidingly to the fixed structure 60 of the braking device 6, which is solid to the frame 3. More specifically, the disks 62 are coupled solidly in rotation, but axially slidingly, on the relative half-shaft 2 means of the hub 16. A coaxial annular element 63 is coupled on each support wall 31 by means of a coupling which uses, in the illustrated embodiment, a crown bearing 69, and is externally equipped with an external cylindrical cogging predisposed to mesh with a cogged sector 64 which is part of the device for the brake control activation. The coaxial annular element 63, equipped with the possibility of rotating limitedly in two directions commanded by the cogged sector 64, is frontally coupled with a disk-pushing element 65 which is mobile in an axial direction and is predisposed to operate on the plurality of disks 61 and 62. The coupling between the coaxial annular element 63 and the disk-pushing element 65 is made by means of ballbearings 68 housed in ramps 66 and 67. The above-described known-type mechanism permits of transforming a rotation of pre-established entity of the coaxial annular element 63 into an axial movement of the disk-pushing element 65. In other words, the rotation of the cogged sector 64 produces the activating of the single braking device. The cogged sector 64 is mounted on a pivot 14 which is housed in a special seating in the cover 32 and which exhibits an end located externally to and solidly connected to the activating lever 12.

The solid connection of the entire block (formed by the frame 3, the cover 32 and all the other parts coupled on them, such as the differential box 5, the two braking devices 6 and the end part 8 of the input drive shaft) to the axle 1 is sealedly coupled, by a flange, on the edge of the collection chamber 7 by means of the flange 33 peripherally arranged all around the cover 32. The connection is made by means of screws 15.

The entire said block can thus be mounted or dismounted on the axle 1 with a very simple introduction operation (or extraction operation in the case of dismounting) in the collection chamber 7 in transversal direction with respect to the longitudinal axis of the axle 1 itself. Naturally both the introduction and the extraction can happen only when the half-shafts 2 are not present (not being inserted on the axle 1) internally to the hubs 16 constrained in rotation to the disks. Once the whole block has been assembled away from the axle, it is mounted on the said axle 1, comprising the end part 8 of the shaft and the braking devices 6 for the two half-shafts 2, by means of a single and simple operation. The compact characteristics of the invention permit a simple and advantageous application on axles, for both large scale and on small-dimension vehicles.

What is claimed is:

1. A differential-brake group for vehicle driving axles, the axle having a left and right wheel associated therewith, the differential-brake group comprising: a frame (3) equipped with two opposite support walls (31), between which a box (5) of a differential (4) is comprised and rotatably supported with relative rotational freedom, the differential (4) is predisposed for transmission of drive to two half-shafts (2) located parallel to a rotation axis of the said box (5) with respect to the said frame (3), each of the two half-shafts being associated with one of the left and right wheel, respectively; both opposite walls (31) with support function being directly associated at their external sides to at least two braking devices (6) singly equipped with means for coupling to respective half-shafts (2) as well as relative control mechanisms; the said braking devices (6) being solidly connected, together with the frame (3), to form a single block, the single block being predisposed and conformed to be mountable or dismountable on the said axle (1) through a single central aperture (7) made in the axis itself, the central aperture providing access to each of said braking devices, by simple introduction or extraction, according to a transversal direction to the said half-shafts (2); and means to permit a correct centering and solid connection of the said single block to the said axle (1).

2. A differential brake group according to claim 1, wherein the same means to permit a correct centering and solid connection of the said single block to the said axle (1) comprises a cover (32) including a flange thereon, said flange being in sealed engagement with an edge of the said central aperture (7) in the axle, and wherein said flange (33) is solid with the cover (32).

3. A differential brake group as defined in claim 2, wherein each of said braking devices (6) is of the oil-immersed disk type and comprises at least a first and second series of coaxial disks (61, 62) side-by-side and arranged alternated one with the other and wherein said braking devices include a fixed structure for mounting said first and second series of disks thereon; the disks (61) of the first series being coupled coaxially sliding to the fixed structure (60) of the said braking devices (6) solid with the said frame (3) and the disks (62) of the second series being rotatingly solidly coupled, but axially slidingly, with the interpositioning of a hub (16), to the relative half-shaft (2); a coaxial annular element (63) being rotatably coupled on each wall (31), wherein the coaxial annular element (63) is activated to make limited rotations controlled by means of a cogged sector (64), said coaxial annular element being frontally coupled with a disk-pushing element (65), mobile in axial direction, said disk-pushing element being predisposed to operate on the at least first and second series of disks (61, 62); and the said annular element (63) being on one side frontally coupled with the said disk-pushing element (65) by means of ball-bearings (68) housed in ramps (66, 67) and being coupled on an outer side, with freedom of rotation on the corresponding wall (31) by means of a thrust bearing.

4. A differential-brake group as defined in claim 3, wherein the said thrust-bearing comprises a crown bearing (69) operating between the walls (31) and the annular element (63) facing the said crown bearing (69).

5. A differential-brake as defined in claim 3, wherein the said control mechanisms for the activating of the at least two braking devices (6) are associated to the cover (32) of the frame (3) and comprise a pivot (14) which is solid to the said cogged sector (64) and which is activated to rotate about its own axis by an external lever (12).

6. A differential-brake group as defined in claim 5, further comprising the cover (32) including a seating (34) made therein, an end part (8) of a drive input shaft into the differential (4) being sealedly coupled to said seating; the end part (8) of the drive shaft comprising a pinion (9) which meshes with a crown wheel (51) which is solidly constrained to the said box (5).

7. A differential-brake group as defined in claim 6, further comprising two double supports (38) made on the cover (32), the double supports (38) being predisposed to permit the direct fixing of actuator cylinders for the execution of one of service braking, emergency braking and hand-braking operations.

* * * * *